United States Patent [19]

Chester

[11] Patent Number: 5,054,806
[45] Date of Patent: Oct. 8, 1991

[54] DUAL FUNCTION VEHICLE TOW HOOK
[75] Inventor: Darren D. Chester, Utica, Mich.
[73] Assignee: Chrysler Corporation, Highland Park, Mich.
[21] Appl. No.: 596,260
[22] Filed: Oct. 12, 1990
[51] Int. Cl.⁵ .............................. B60D 1/04
[52] U.S. Cl. ........................ 280/495; 280/504; 280/762; 410/23
[58] Field of Search ............... 280/480, 495, 496, 498, 280/503, 504, 762; 410/7, 11, 23, 112; 411/174, 523

[56] References Cited

U.S. PATENT DOCUMENTS

| | | | |
|---|---|---|---|
| 1,408,081 | 2/1922 | Deems | 280/496 |
| 2,064,415 | 12/1936 | Colman | 410/11 |
| 2,670,951 | 3/1954 | Lucky | 280/480 |
| 4,431,212 | 2/1984 | Hirabayashi et al. | 280/762 |
| 4,684,305 | 8/1987 | Dubost | 411/174 |

FOREIGN PATENT DOCUMENTS

| | | | |
|---|---|---|---|
| 6805 | 1/1987 | Japan | 280/495 |
| 23877 | 1/1987 | Japan | 410/7 |

*Primary Examiner*—Charles A. Marmor
*Assistant Examiner*—Mitchell Bompey
*Attorney, Agent, or Firm*—Edward P. Barthel

[57] ABSTRACT

A vehicle dual function tow hook bent from one length of steel bar stock into a generally P-shaped member so as to be available for either a tie-down line, a towing line, or a tow bar. The tow hook comprises upper and lower longitudinally extending rod-stem portions having their aft ends terminating in upper and lower eyelet portions separated by a gap for receiving a substructure flange of the vehicle therein. With the eyelet portion central openings aligned with an aperture in a flange a single fastener secures the tow hook on the flange. The upper rod-stem portion has a length at least twice the length of the lower rod-stem portion while the lower rod-stem portion forward end terminates in a bend portion joined to a downwardly sloped rod-angled portion. The forward ends of the upper rod-stem portion and the rod-angled portion are joined by an open loop portion available for a towing or tie-down line. The tow hook provides a fail-safe condition whereby upon a tow bar load transmitting an excessive compressive force the two hook open loop portion deforms downwardly in a controlled manner obviating damage to the vehicle substructure.

2 Claims, 2 Drawing Sheets

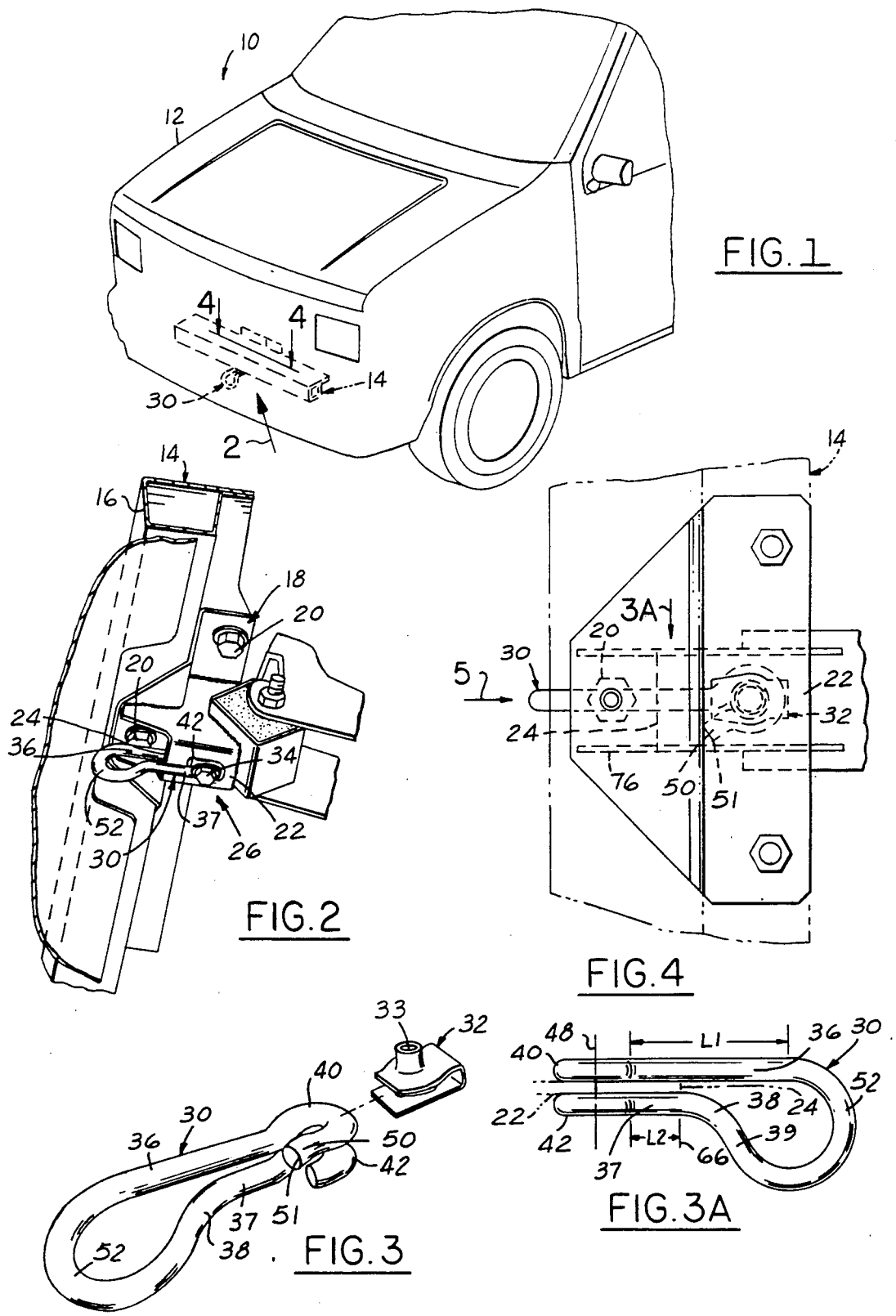

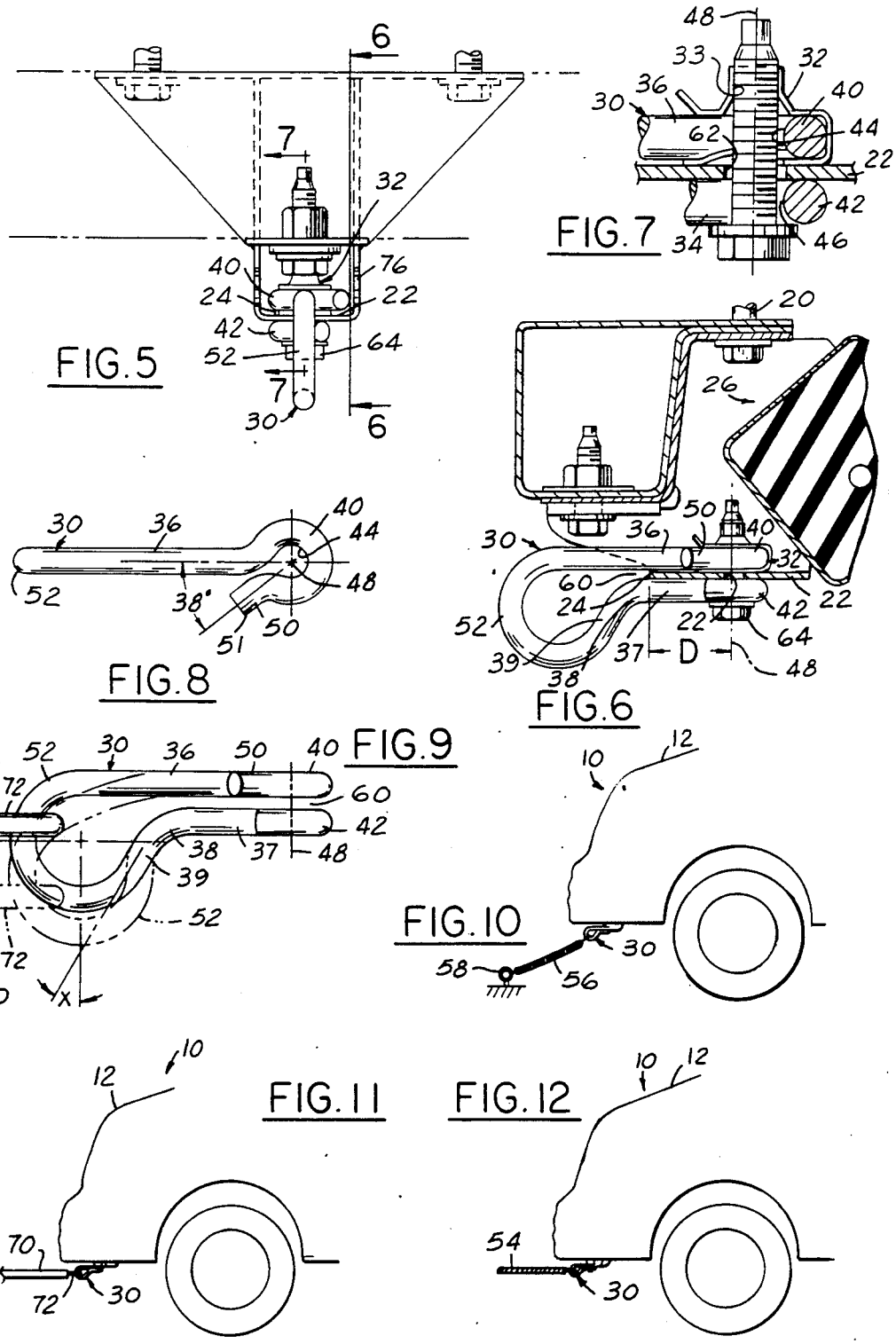

DUAL FUNCTION VEHICLE TOW HOOK

BACKGROUND OF THE INVENTION

This invention relates generally to a tow hook for an automotive vehicles and, more particularly, to an improved tow hook adapted in one mode for use with either a towing line or a tie-down line and in a second mode for use with a tow bar.

An example of a prior art towing hook for pulling a vehicle is shown in U.S. Pat. No. 4,431,212 issued Feb. 14, 1984 to Hirabayashi et al. The '212 patent discloses a towing hook welded to the underside of a rear portion of a vehicle. The hook is formed of a U-shaped bar with circular section with one end of the hook welded to the bottom of a spare tire housing in the longitudinal direction of the vehicle body while the other end is vertically welded to the back side of the spare tire housing. A curved portion of the hook, which is used as a jacking point, projects downwardly from the underside of the vehicle body. A jack is designed to engage the curved portion of the hook.

SUMMARY OF THE INVENTION

It is a feature of the present invention to provide an improved vehicle tow hook bent into a generally P-shaped member from a single length of steel rod stock which hook is readily mounted on a vehicle body substructure by a single fastener.

It is another feature of the present invention to provide an improved tow hook as set forth above wherein the tow hook is mounted on a substructure flange wherein the flange is clamped between upper and lower spaced tow hook eyelets upon tightening a threaded fastener extending vertically through the eyelets and an aperture in the flange.

It is another feature of the present invention to provide an improved dual mode vehicle tow hook as set forth above usable in a first condition with either a towing or tie-down line and a second condition with a rigid tow bar.

It is still another feature of the invention to provide an improved tow hook as set forth above incorporating a fail-safe design operative, upon receiving excess tow bar reaction loads, to downwardly deform its open loop portion in a controlled manner obviating damage to the vehicle substructure.

It is a further object of the present invention to provide an improved vehicle tow hook as set forth above including means to readily align the hook in a predetermined manner longitudinally of the vehicle prior to tightening a single threaded fastener. The present invention provides a dual function tow hook arrangement adapted for ready attachment to an automotive vehicle substructure flange. The toe hook is bent from one length of steel bar stock of circular cross section into a generally P-shaped member so as to be available for use with a tie-down line, a towing line, or a tow bar. The tow hook comprises upper and lower horizontal rod-stem portions joined to a forward open loop portion disposed in a vertical plane. The rod-stem portions terminate in aft horizontally disposed vertically spaced eyelet portions with the upper eyelet having a U-type spring steel nut snapped thereon. The pair of eyelet portions define upper and lower semi-circular openings with their centers aligned on a vertical axis.

The upper rod-stem portion has a length at least twice that of the lower rod-stem portion while the lower rod-stem portion forward end is connected, by a bend portion, to a forwardly sloped rod-angled portion. The open loop portion completes the tow hook by joining the forward ends of the upper rod-stem portion and the rod-angled portion.

The vehicle substructure includes a horizontal flange having an aperture therein spaced a predetermined distance from the forward transverse edge of the flange. A gap of determined height is provided between the upper and lower rod-stem portions and their associated eyelet portions. The substructure flange, adapted to be received in the gap, has an aperture formed therein allowing a threaded fastener to be passed through the upper eyelet clip, the lower eyelet portion openings, and the flange aperture. Tightening the fastener pinches the flange between the eyelets fixedly positioning a transition point, defined by the lower rod-stem juncture with the angled rod-length portion, in substantial coincidence with the flange leading edge.

A tow bar mode is provided wherein a towing vehicle rigid tow bar is coupled to the hook open loop. Braking of the towing vehicle will cause resultant reaction loads to be transmitted by the tow bar to the hook open loop. By virtue of the above described unique fail-safe arrangement an excessive reaction load, such as a panic stop, may cause an excessive force on the hook open loop portion causing it to deform downwardly in a predetermined controlled manner obviating damage to the towed vehicle hook supporting substructure.

BRIEF DESCRIPTION OF THE DRAWINGS

The present invention will be better understood by reference to the following detailed description of a preferred embodiment when read in conjunction with the accompanying drawings in which like reference characters refer to like parts throughout the view and in which:

FIG. 1 is a fragmentary perspective view of the front end portion of an automotive vehicle equipped with a towing hook according to the present invention;

FIG. 2 is an enlarged fragmentary perspective view taken in the direction of arrow "2" in FIG. 1 showing the towing hook mounted to a support flange portion of an engine mount of the vehicle;

FIG. 3 is an enlarged exploded perspective detail view of the towing hook and mounting clip of the present invention;

FIG. 3A is a detail side elevational view of the tow hook, taken in the direction of arrow 3-A in FIG. 4, with flange edge 24 shown in phantom;

FIG. 4 is a fragmentary top elevational view taken on the line 4—4 of FIG. 1;

FIG. 5 is an enlarged fragmentary front elevational view taken in the direction of arrow "5" of FIG. 4;

FIG. 6 is a fragmentary vertical sectional view, partly in elevation, taken on the line 6—6 of FIG. 5;

FIG. 7 is an enlarged fragmentary vertical sectional view, partly in elevation, taken on line 7—7 of FIG. 5;

FIG. 8 is a detail top elevational view of the tow hook;

FIG. 9 is a schematic side elevational view of the tow hook showing its designed failure mode in phantom; and FIGS. 10, 11, and 12 are similar views of the towing hook on the front end of a vehicle showing the hook being used in its maritime shipping tie-down mode, its tow bar towing mode, and its rope towing mode, respectively.

DETAILED DESCRIPTION OF THE INVENTION

Referring now to the drawings and more particularly to FIG. 1 there is shown a front end portion of an automotive vehicle having a body 12 supported on a substructure frame or chassis partially indicated at 14. As seen in FIG. 2 the substructure 14 includes a box-sectioned cross member 16 having a motor mount bracket 18 secured thereto by a plurality of bolts 20. The motor mount bracket 18 has a flange 22 formed with a transversely extending forward or leading edge 24 adapted for supporting a tow hook structure generally indicated at 26. As seen in FIGS. 2 and 3 the tow hook structure comprises a tow hook member 30, a conventional U-type spring steel nut or clip 32, having an internally threaded circular opening or bore 33 therein, a threaded bolt 34, and the motor mount bracket substructure supporting flange 22.

With reference to FIG. 6 the hook member is preferably formed from cold rolled mild steel bar stock having a diameter of about 9.5 mm. The tow hook is bent into a generally P-shaped member in side elevation comprising upper and lower longitudinally extending parallel linear rod-stem portions 36 and 37, respectively. It will be noted in FIG. 3A that the upper rod-stem portion 36 has a dimension L1 while the lower rod-stem portion 38 has a dimension L2 with L1 being at least twice as long as L2 for a reason to be explained. It will be further noted that the lower rod-stem portion 37 forward end is connected by a bend portion 38 to an oblique downwardly and forwardly rod-angled portion 39. In the preferred embodiment the rod-angled portion 39 is sloped forwardly so as to define an angle "X" of about 30 degrees from the vertical.

With reference to FIGS. 6 and 8 it will be seen that the upper and lower rod-stem portions 36 and 37 terminate at their aft ends in upper and lower eyelets 40 and 42, respectively. The upper and lower eyelets 40 and 42 define upper and lower semi-circular openings 44 and 46, respectively having their centers, together with the center of the clip opening 33 aligned on a common vertical axis 48. The upper and lower eyelets 40 and 42 are identical except that the upper eyelet is formed with an extended tail portion 50 for a reason to be explained below.

FIG. 6 shows the upper rod-stem portion forward end and the angled rod-length portion 39 forward end are joined by an arcuate open loop portion 52 available for either a towing line 54 shown in FIG. 12 connected to a towing vehicle (not shown) or a tie-down line 56 shown in FIG. 10 connected to a screw eyelet 58 for maritime shipping or the like.

As best seen in FIG. 6 the tow hook upper and lower rod-stem portions 36 and 38 together with the associated eyelets 40 and 42 are vertically spaced a predetermined vertical distance apart to define a gap 60. The gap 60 is sized to receive therein the leading free end of a vehicle substructure flange such as the motor mount flange 22. With reference to FIG. 7 it will be seen that the flange 22 has an aperture 62 with its center located a predetermined longitudinal distance "D" from the support flange leading edge 24. It will be noted in FIG. 7 that with the tow hook upper and lower eyelet vertical axis 48 aligned with the flange aperture 62 a securing fastener or bolt 64 is inserted upwardly through the eyelet semi-circular openings. In the preferred embodiment the conventional U-type spring steel clip 32 is clipped on the upper eyelet 40 in a snap-action manner to threadably receive the bolt 64 in clip threaded bore 33.

In FIGS. 9 and 11 the tow hook arrangement provides a fail-safe design for sudden or panic stops when used with a rigid tow bar 70. It will be seen that the tow bar has a suitable snap-on connector 72 that couples on the hook open loop 52. A panic stop by the towing vehicle will cause a reaction wherein the tow bar 70 will exert a compressive force on the tow hook. By virtue of the predetermined location of aperture 62 the attached tow hook lower rod-stem portion 38 forward transition point between the rod portions 37 and 39, indicated by dimension line 66 in FIG. 5A, coincides with the support flange leading edge 24. As a result, the upper rod-stem portion 36 is positioned with at least one-half of its overall length L1 unsupported by the flange 22. This arrangement, together with the transition point of line 66 between the bend portion 38 and the lower rod-stem portion 37, provides a designed failure condition during compression loading by the tow bar 70. As a result FIG. 9 shows the hook open loop portion 52 deformed downwardly in a controlled manner to its phantom line position. Such controlled deformation obviates damage to the vehicle substructure such as the motor mount 26, for example.

With reference to FIG. 5 it will be seen that the support flange 22 is formed with a vertically disposed longitudinally extending side flange 76. It will be noted that the center of the support flange aperture 62 is spaced laterally from the side flange 76 a predetermined distance. As a result, with the upper eyelet tail portion 50 having its outboard edge 51 contacting the flange wall opposed surface the tow hook 30 is positioned in a longitudinal plane parallel to the plane of the side flange 76. Thus, the assembly line installer is only required to pivot the tow hook about the bolt 34 prior to tightening until the tail portion outboard edge contacts the side flange opposed surface and torque-down the bolt 34 to correctly position the tow bar 30 on the vehicle in a ready manner.

Although the present invention has been shown and described with reference to a preferred embodiment thereof, and in terms of the illustrated drawings, it should not be considered as limited thereby. Thus, various possible modifications, omissions, and alternatives could be conceived by one skilled in the art without departing from the scope of the present invention. Therefore, the scope of the invention should be defined solely by the scope of the appended claims which follow.

What is claimed is:

1. For use in combination with an automobile vehicle substructure flange, a toe hook comprising:
   a one-piece generally P-shaped tow hook bent from steel rod stock of circular section, said tow hook comprising upper and lower horizontally extending parallel rod-stem portions each having forward and aft ends, each said upper and lower rod-stem portion aft end terminating in a horizontally disposed eyelet, whereby a pair of vertically spaced upper and lower eyelet portions are provided with each said upper and lower eyelet defining a semi-circular opening;
   said upper eyelet portion including fastener engaging means secured thereto with said fastener engaging means provided with a threaded circular opening, whereby said threaded circular opening and said lower eyelet semi-circular opening located with the centers thereof aligned on a common vertical axis;

said upper rod-stem portion having a length at least twice the length of said lower rod-stem portion, said upper and lower rod-stem portions having their respective forward ends joined by an open loop portion available for either a towing line, a tie down line, or a tow bar;

said upper and lower rod-length portions and their associated eyelet portions spaced a predetermined vertical distance apart defining a gap therebetween, said substructure including a horizontally disposed flange having a transversely extending forward free edge, said gap sized for receiving therein said flange such that an aperature in said flange is aligned with said common axis for receiving a threaded fastener therethrough;

whereby upon the threaded fastener being received first in said lower eyelet semi-circular opening and thereafter passing through the flange aperature and said fastener engaging means threaded circular opening, whereby tightening said threaded fastener causing said eyelets to clamp said flange therebetween fixedly securing said tow hook thereon; and wherein said flange aperature having its center spaced a predetermined longitudinal dimension from said flange transverse free edge, such that said lower rod-stem portion forward end substantially coincides with said flange free edge, whereby upon a tow bar being coupled to said tow hook open loop portion so as to transmit a predetermined force thereto causing said open loop portion to deform downwardly in a controlled manner whereby damage to said vehicle substructure flange is obviated.

2. The combination as set forth in claim 1 wherein said fastener engaging means in the form of a U-shaped spring steel clip adapted for snap-action engagement on said upper eyelet portion such that said threaded circular opening center is aligned on said common vertical axis.

* * * * *